United States Patent [19]

Hauser

[11] Patent Number: 5,056,211
[45] Date of Patent: Oct. 15, 1991

[54] METHOD FOR THE MANUFACTURE OF A BALL NUT AND SCREW SPINDLE SYSTEM

[75] Inventor: Karl-Heinz Hauser, Steinenbronn, Fed. Rep. of Germany

[73] Assignee: NEFF GmbH, Waldenbuch, Fed. Rep. of Germany

[21] Appl. No.: 499,048

[22] Filed: Mar. 26, 1990

[30] Foreign Application Priority Data

May 30, 1989 [DE] Fed. Rep. of Germany ....... 3917578

[51] Int. Cl.$^5$ ............................................. B21B 15/00
[52] U.S. Cl. .................................. 29/527.2; 164/98; 249/83; 249/87; 425/110; 264/221; 264/267; 264/269; 264/313; 264/317
[58] Field of Search ............... 264/269, 313, 267, 221, 264/317; 425/110; 249/83, 87; 29/434, 435, 527.1, 527.2; 164/98

[56] References Cited

U.S. PATENT DOCUMENTS 2,855,792 10/1958 Gates .
4,342,235 8/1982 Benton .

FOREIGN PATENT DOCUMENTS 1923742 7/1970 Fed. Rep. of Germany .
2355844 6/1974 Fed. Rep. of Germany .
2437497 12/1975 Fed. Rep. of Germany .
0198750 10/1986 Fed. Rep. of Germany .

Primary Examiner—David A. Simmons
Assistant Examiner—Merrick Dixon
Attorney, Agent, or Firm—Frishauf, Holtz, Goodman & Woodward

[57] ABSTRACT

A ball screw system has a screw (1, 2) and a nut (3) mounted thereon by means of balls (5). Redirecting portions (6) which delimit redirecting channels for circulating balls running in thread grooves of the screw and the nut are formed in openings extending transversely in the nut. The openings in the nut are filled with an initially liquid, solidifiable or curable material. The redirecting ball or recirculating channels are thereby cast therein.

14 Claims, 4 Drawing Sheets

METHOD FOR THE MANUFACTURE OF A BALL NUT AND SCREW SPINDLE SYSTEM

FIELD OF THE INVENTION

The invention relates to a ball screw system comprising a shank with a screw thread thereon and a nut on the screw with interposed balls, and to a method of making a ball redirecting arrangement in the nut.

BACKGROUND

It is known to provide at least one opening in the wall of the nut which leads to the inner side thereof. A redirecting portion or piece which includes a redirecting or ball recirculating channel for returning balls, running in thread grooves of the screw and the nut, is located in the opening. The redirecting channel of the redirecting piece opens into at least one thread groove of the nut and has associated with it an abutment shoulder for the balls, which protrudes into this thread groove.

A ball screw with these features is known, for example, from German Patent 2,355,844. The redirecting piece is made of a plastics material and contains a substantially U-shaped redirecting channel joining two adjacent thread grooves of the nut. It is inserted from the inside into a continuous, cylindrical bore in the wall of the nut. The redirecting piece is provided with a projection which fits into a corresponding recess in the screw nut in order to position and fix it correctly. To ensure silent operation of the ball screw, measures must be taken to prevent both the redirecting channel itself and the region in which it opens into the thread grooves of the nut and the screw from having any abrupt transitions or other irregularities which would impair the quiet running of the balls. Therefore, in view of the manufacturing tolerances, the prefabricated redirecting pieces have to be adapted to the bore in the wall of the nut and adjusted in relation to the screw, and subsequent machining, for example, grinding is additionally required during assembly.

The same applies in principle to ball screws wherein the ball-redirecting pieces inserted in corresponding openings in the wall of the nut delimit only parts of the ball-redirecting channel which is continued through a bore in the wall of the nut (see, for example, German Patent Disclosure Document DE-OS 1,923,742). Here additional care must be taken to ensure that there are no undesired abrupt transitions at the point where the redirecting pieces join the redirecting channel bore in the wall of the nut, which similarly result in noise and premature wear.

THE INVENTION

It is an object to provide a ball screw system, and a method to make it which enables the nuts of ball screws to be equipped in a simple, efficient manner with a ball-redirecting or recirculating arrangement which is particularly quiet and provides wear-resistant guidance for the balls.

Briefly, a mold part is provided which at least in the region of the opening of the nut corresponds substantially to a negative profile of the screw. A mold core which is designed in accordance with the shape of the redirecting channel is inserted into the nut. The opening is then filled with a free-flowing solidifiable material, whereby the redirecting portion or piece is formed. The mold part and the mold core is removed again after curing of the material.

In this context, "filling" means the normal or pressureless casting process, as well as any pressure die-casting or injection process. "Negative profile" means the complementary profile of a body, that is, where the body is formed with a depression, the "negative profile" has a projection, and vice versa. Thus, if the body has a groove, the negative profile will be a ridge.

The mold part corresponding to the negative profile of the screw advantageously comprises at least one mold cavity corresponding to the abutment should so that the latter is also produced directly during the casting operation. The abutment shoulder may extend somewhat into the associated thread groove of the nut in order to ensure stable, precise supporting of the balls as they run out of the thread groove.

The solidifiable material may be a plastic which may be thermosetting or any curable casting material.

Metal or a metal alloy, for example aluminum, may also be used for this purpose.

In a preferred embodiment, the mold core corresponding to the redirecting channel is formed of an elastically flexible material, for example, an appropriately cut-off piece of a commercially available O-ring, as customarily used for sealing purposes. After curing of the molded piece, such a rubber-elastic, circular-cylindrical mold core automatically produces an ideal redirecting curve for the balls because during assembly its inherent elasticity causes it to seek a position in which its neutral core follows the best path.

It is, of course, in principle, also possible to use a mold core which is performed or a mold core which consists of a material which can be melted or dissolved out of the cured redirecting piece.

The fact that the redirecting piece is cast on the spot in the nut itself and hence is practically molded to the latter, with the free-flowing casting material filling out even the smallest interstices in the mold cavity delimited by the mold part of the nut and the mold core, ensured that right from the start there are no disturbing transitions in the region of the ball-redirecting channel. The wall of the ball-redirecting channel extends smoothly and steplessly throughout its entire length. In this way, both the noise and the wear are reduced to a minimum without additional measures. As a rule, subsequent machining is unnecessary, while at the same time all expenditure for assembly and adjustment of the redirecting piece is eliminated. Finally, the new method permits closer manufacturing tolerances for the opening which receives the redirecting piece and its position relative to the thread grooves of the nut because any dimensional deviations are automatically compensated during the casting of the redirecting piece.

DRAWINGS

FIG. 1 is a perspective illustration of a ball screw according to the invention, with the nut partly cut open, FIG. 2 a view taken along line II—II of FIG. 3 of the nut of the ball screw according to FIG. 1, with the mold part inserted, to illustrate the state prior to the pouring-in of the curing material, FIG. 3 a side view of the arrangement according to FIG. 2, with the nut illustrated in axial cross-section, FIG. 4 a perspective illustration of the arrangement according to FIG. 3, with the nut partly cut open, and FIG. 5 a plan view of the nut of the arrangement according to FIG. 2, taken along line V—V of FIG. 2, on a different scale, to illustrate the inside of the redirecting piece cast therein.

DETAILED DESCRIPTION

Figure 1:
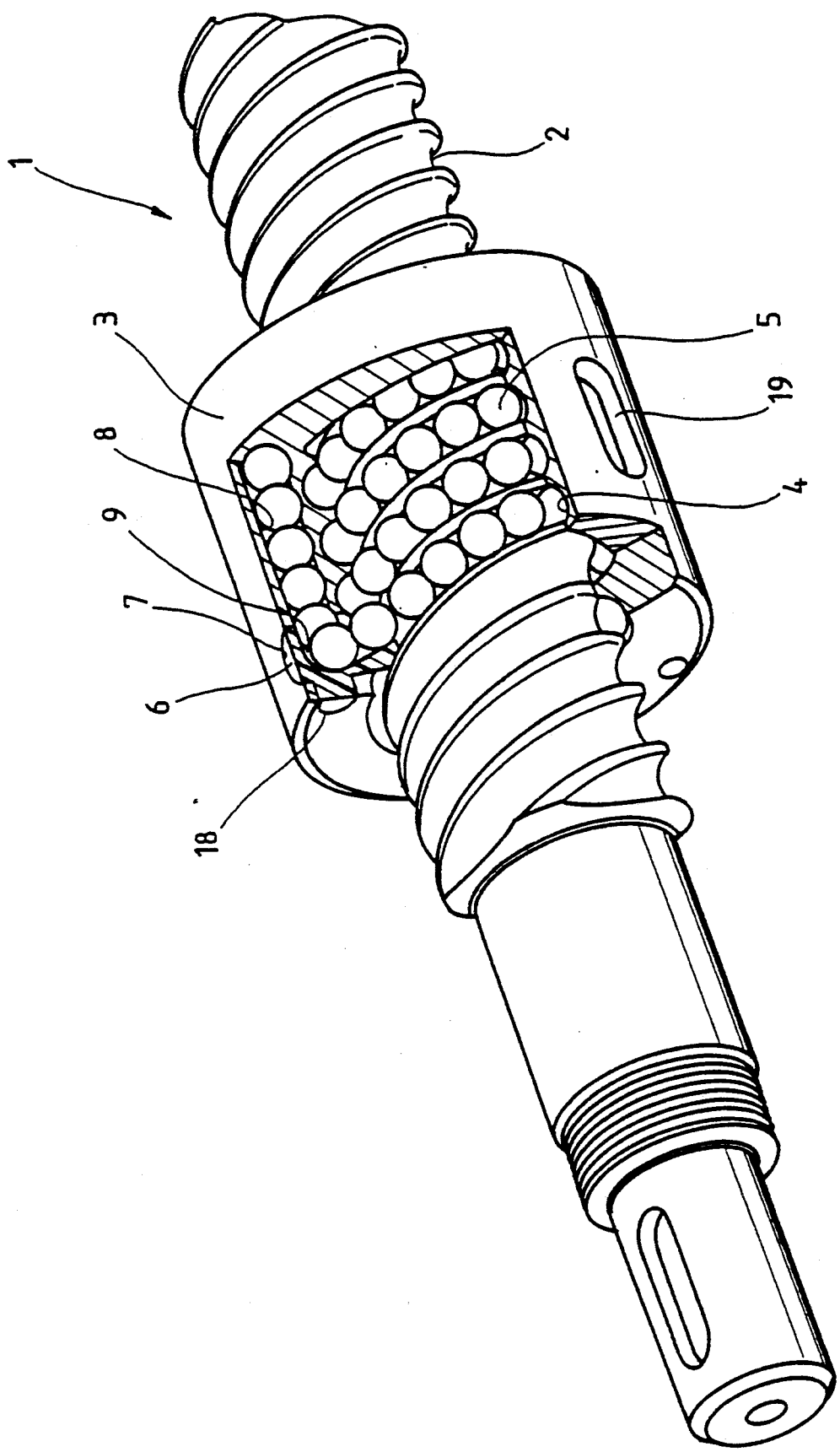

The ball screw system illustrated in FIG. 1 comprises a screw shank or spindle 1 formed on its circumference with a thread with thread turns or grooves 2. A cylindrical nut 3 is positioned on the screw 1, thereby enclosing it. The nut 3 is provided with a corresponding internal thread whose thread turns or grooves are designated 4. The grooves 2 in the spindle 1 and the grooves 4 in the nut 3 form raceways for balls 5 which are retained in low-friction manner on the spindle 1 by the nut 3; the grooves 2 and 4 are spiral grooves.

A ball redirecting arrangement is located in the vicinity at the end faces of the nut 3, in order to return and redirect balls 5 outside of the grooves 4 from one end of the nut 3 to the other.

Figure 5:
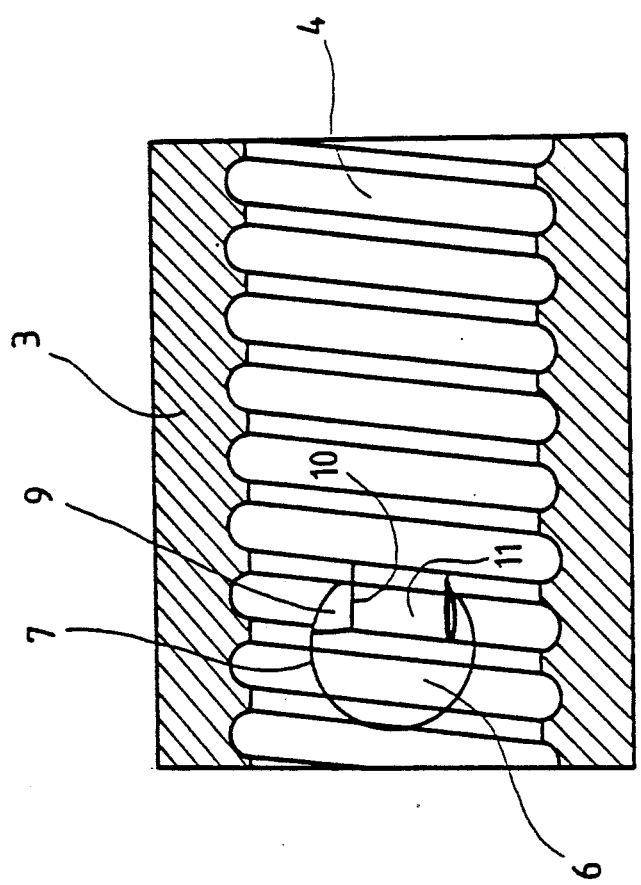

The ball return arrangement has two ball deflection or return elements 6. In FIGS. 1 and 5, only one is shown. The ball redirecting elements are fitted into suitable cylindrical radius bores 7 in the wall of the nut 3. The bores 7 are through-bores. The deflection or redirecting elements 6 are made of a curable plastic or a metal, for example a metal alloy. The redirecting element 6 is cast into the associated bore 7 of the nut 3. The bore 7 is closed off upon formation of the deflection or redirecting element with one of the above referred-to casting or pouring compounds which, then, is hardened, and as will be described in detail below. This hardening may be a chemical curing process, a thermosetting process, or merely cooling of a metal casting alloy.

The two redirecting elements or portions 6 join against an axial bore 8 formed in the wall of the nut 3. Bore 8 extends parallel to the axis of the nut. Bore 8 terminates at both ends in the bores 7 and forms a portion of the ball deflection or recirculating duct or channel, so that the balls 5 are deflected by substantially 90°. The redirecting channel portions 9 which deflect the balls 5 by essentially 90° are formed within the deflection elements 6, and enter the respectively associated thread groove 4 of the nut 3. In the end region, the channel portions 9 are delimited; on one side by an abutment shoulder 10 (FIGS. 2, 5) which protrudes into the thread groove 4. The arrangement and configuration of the abutment shoulder 10 is apparent, in particular, from FIGS. 2 and 5. The abutment shoulder 10 formed on the redirecting portion 6 protrudes into the associated thread groove 2 on the side opposite the entrance of the redirecting channel portion 9 with a rib-shaped portion 11, thereby providing a stable support for the associated wall region of the redirecting channel portion 9.

The redirecting channel portions 8, 9 are of substantially circular cross-sectional shape which is adapted to the diameter of the balls 5 so that they may freely pass through the redirecting channel.

METHOD OF MAKING REDIRECTING PORTIONS 6

The redirecting portions 6 are cast in the bores 7 of the nut 3 in the following manner. In this connection, reference is made, in particular, to FIGS. 2 to 4:

A mold part 12 corresponding over approximately half of its circumference to a negative profile of the screw 1 is inserted into the nut 3. The raised thread turns 13 of the mold part 12 fit sealingly into the thread grooves 4 of the nut 3. A supporting part in the form of a wedge 14 with the shape of part of a circle, in cross-section, is similarly inserted into the nut 3 and holds the mold part 12 in abutment against the inside wall of the nut 3. In principle, it is, of course, also conceivable to dispense with the supporting part 14 and to press the nut 3 onto the mold part 12, when part 12 is supported at an end.

Figure 3:
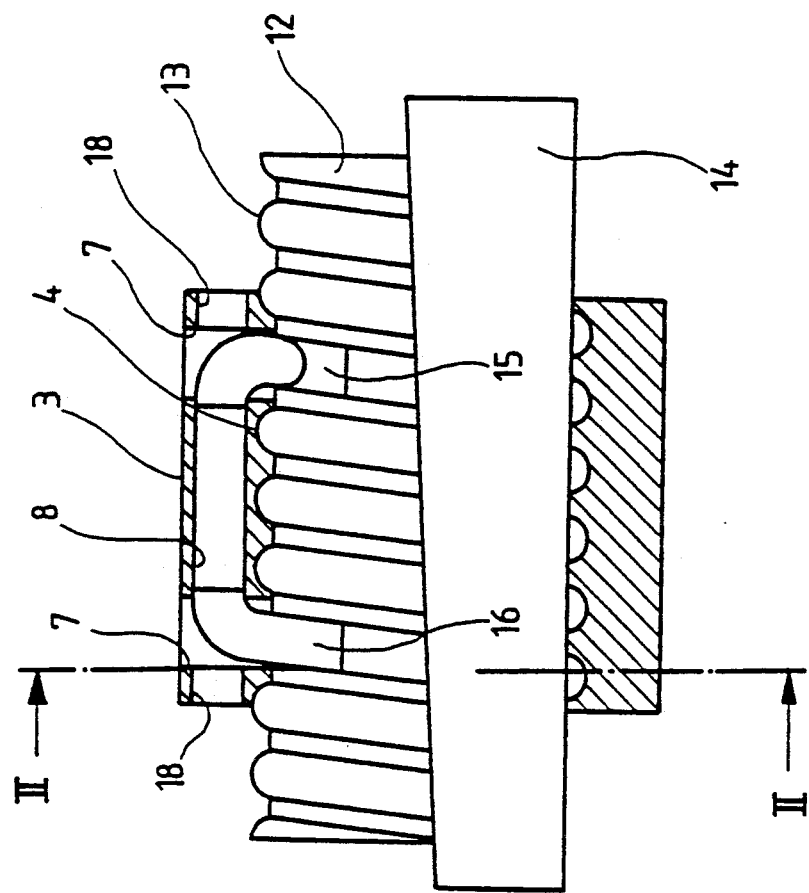
Figure 2:
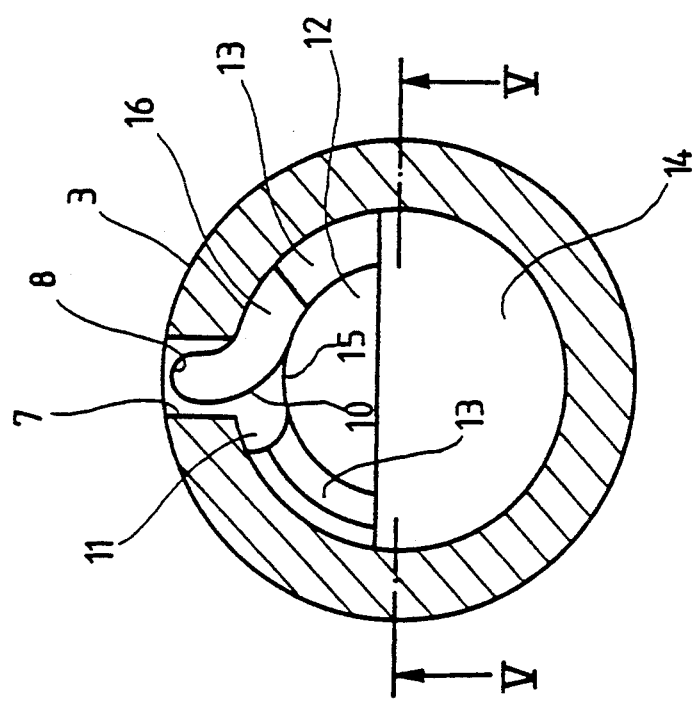
Figure 4:
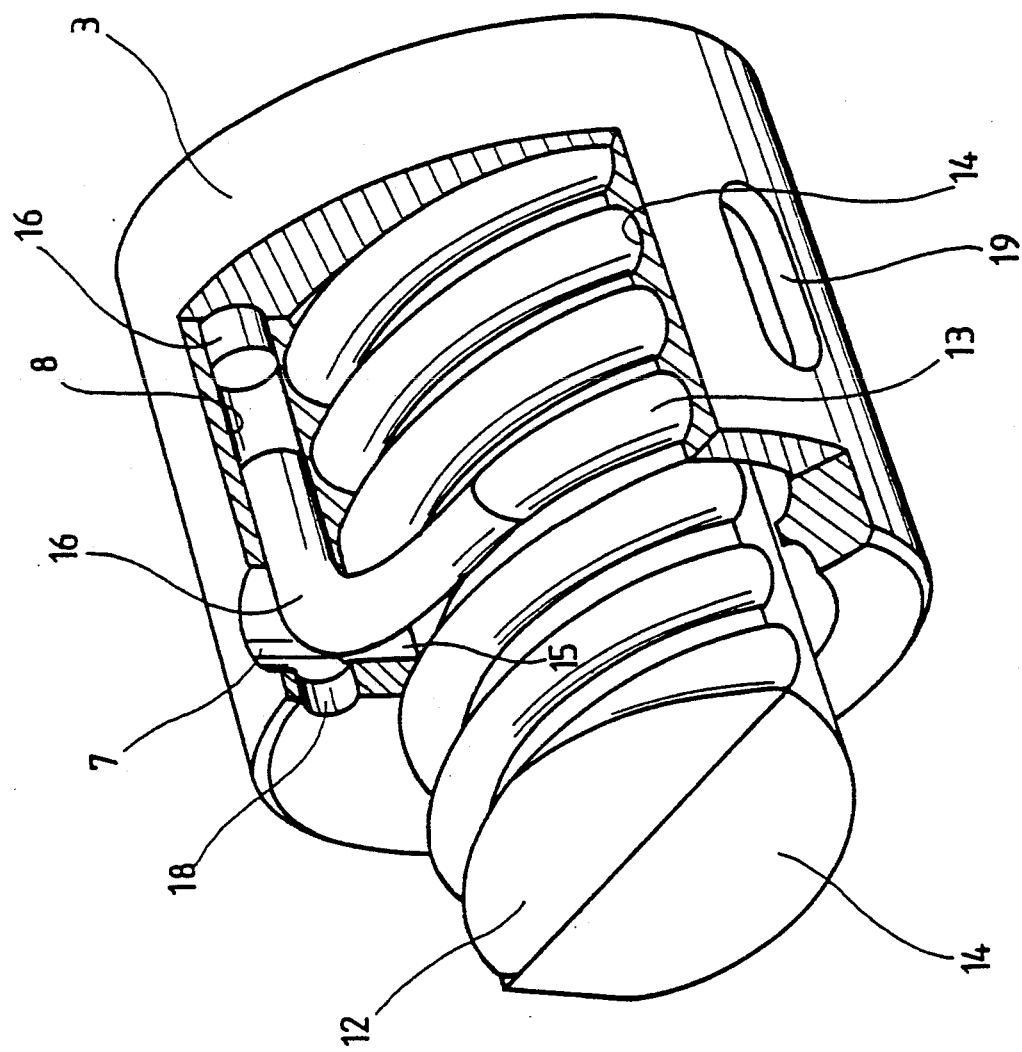

The two raised thread turns 13 of the mold part 12 have groove-like recesses in the regions opposite the bores 7 of the nut 3, as indicated at 15 in FIGS. 2 and 3. Inserted in these recesses which have, in cross-section, the shape of part of a circle, is a cylindrical mold core 16 which in FIG. 3 is shown inserted in the left-hand bore 7 only; the right-hand bore 7 of FIG. 3 is left free to illustrate the ball deflection channel before casting of the solidifiable material. The mold core 16 consists of an appropriately cut-off piece of an elastic O-ring made of plastic, as customarily used for sealing purposes. This piece which is of circular cross-section and whose diameter corresponds to the diameter of the redirecting channel 8, 9 is attached at one end at 15 to the mold part 12, thereby continuing the corresponding thread turn 13, and is inserted at the other end into the bore 8 of the nut 3, thereby extending in an approximately L-shaped bend configuration within the bore 7.

With the nut 3 thus prepared as casting mold, the two bores 7 are now filled with the free-flowing, curable or settable casting material, whereby the two redirecting portions 6 are formed. Their outline—including the course of the redirecting channel portion 9—is immediately apparent from FIGS. 1 and 2. During this filling operation, the bore potions 18 (FIG. 3) leading outwardly from the straight redirecting channel portion 8 are filled simultaneously. These end portions 18 arose upon forming bore 8. Filling portions 18 simultaneously with bore 7 results in additional positively connected anchoring of the molded pieces 6 obtained after curing of the casting material.

After the curing of the casting material, the supporting part 14 is pulled out, whereupon the mold part 12 and the two mold cores 16, of which only one is shown in FIG. 3, may be removed.

Since the two mold cores 16 exhibit a completely smooth surface condition and when inserted into the redirecting channel portion 8 of the nut 3 prior to the casting adjust automatically as a result of their elastic properties such that their neutral fiber or core extends in a manner which is as free from stress as possible, the redirecting channel also automatically acquires a shape in its portions 9 which is optimal for proper running of the balls.

During the casting operation, the free-flowing casting material fills out all interstices; it clings to the outside wall of the mold core 16 and thereby ensures that the redirecting channel extends in a completely stepless manner. At the same time, the abutment shoulder 10 together with its rib 11 is also properly formed in the region engaging the associated thread groove 2 of the screw 1, as is readily apparent from FIG. 2.

Instead of the above-described mold core 16 consisting of a piece of a cut-open O-ring, a preshaped mold core consisting of another material, for example, metal could be used. It is similarly possible for the mold core 16 to be formed from wax, etc. With an appropriate choice of materials, it is also possible for the mold core 16 to be melted or dissolved out of the molded pieces 6 after curing of the casting material.

Instead of the cylindrical bores 7, it is naturally also possible to provide openings with a different shape, if this should prove expedient in the individual case. The openings 7, may, for example, be designed in the form of elongate holes as indicated in principle at the bottom of FIG. 1 at 19, if the redirecting piece 6 contains the entire U-shaped, redirecting channel 9 which opens into two adjacent thread grooves 4 in such a way that the straight redirecting channel portion 8 of FIG. 3 is eliminated. In principle, undercuts, projections, etc. may be provided in the region of the opening in the wall of the nut 3 which receives a redirecting piece 6 in order to achieve an additional positive connection between the redirecting piece and the nut 3.

The abutment shoulder 10 and its associated rib 11 are formed directly on the associated redirecting piece 6 by filling corresponding mold cavities provided on the mold part 12 (see FIG. 2). In individual cases, it is also conceivable for the shoulder and/or rib elements are cast as separate parts consisting, for example, of metal cast into the redirecting pieces 6.

Various changes and modifications may be made within the scope of the inventive concept.

I claim:

1. Method for the manufacture of a nut (3) of a ball screw spindle system,
    in which the nut (3) has a ball redirecting means (6),
    said redirecting means defining a redirecting channel (8, 9) for returning balls (5) running in a thread groove (2) of the screw spindle of the system and also within a thread groove (4) of said nut,
    said redirecting channel (8, 9) opening into at least one thread groove (4) of said nut and being delimited there at one side by an abutment shoulder (10) for said balls (5) located in said nut, and which protrudes into said nut thread groove (4),
    said method comprising
    forming at least one opening (7, 19) in the wall of said nut (3), said opening leading to the thread groove (4) thereof;
    inserting a mold part (12) which, at least in the region of said opening (7, 18) of said nut (3), corresponds substantially to a negative profile of the thread groove of the nut;
    inserting a mold core (16) which is shaped and dimensioned in accordance with the shape of said redirecting channel (8, 9) into said nut in a region intersecting said opening (7, 18);
    then filling a free-flowing solidifiable or hardenable or curable material through said opening into said nut to flow to said mold part and around said mold core (16) and filling said opening; and
    removing said mold part (12) and said mold core (16) after solidification or hardening or curing of said material, thereby leaving said redirecting channel in the nut, while maintaining the integrity of said thread groove (4) in the nut.

2. The method according to claim 1, characterized in that said mold part (12) comprises at least one mold cavity corresponding to said abutment shoulder (10) for the balls (5).

3. The method according to claim 1, characterized in that the solidifiable material comprises a curable plastic material.

4. The method according to claim 1, characterized in that the solidifiable material comprises a metal or metal alloy.

5. The method according to claim 3, characterized in that said mold core (16) comprises a material which can be melted or dissolved out of said cured redirecting means (6).

6. The method according to claim 1, characterized in that said mold core (16) comprises an elastically flexible material.

7. The method according to claim 6, characterized by bending said mold core (16) into a shape corresponding to the configuration of the redirecting channel (8, 9) when inserted into said nut (3).

8. The method according to claim 1, wherein said filling step includes casting interengaging support means in the region of said opening (7), in said nut (3), to form interlocked supporting means for said redirecting means (6).

9. The method according to claim 1, characterized in that said redirecting channel (8, 9) is located throughout its entire length within the redirecting means (6).

10. The method according to claim 1, characterized in that at least two openings (7) are formed in the circumferential wall of the nut; and
    in that the redirecting means includes an essentially axially extending channel portion (8), said at least two openings formed in said nut (3) being connected by said channel portion (8); and
    wherein the inserting step comprises
    inserting at least one mold core (16) into said redirecting channel portion (8) from said openings (7).

11. The method according to claim 10, characterized in that said redirecting channel portion (8) is in the form of a longitudinal bore in the wall of said nut (3).

12. The method according to claim 1, characterized in that said mold part comprises an at least two mold part elements (12).

13. The method according to claim 1, characterized in that said redirecting means (6) is installed in said system devoid of after-machining after the curing step.

14. The method according to claim 1, wherein said redirecting means (6) comprises a portion of said nut (3).

* * * * *